US012718382B2

(12) United States Patent
Wang

(10) Patent No.: US 12,718,382 B2
(45) Date of Patent: Aug. 25, 2026

(54) METHOD AND APPARATUS FOR DATA PROCESSING BASED ON EVENT CAMERA

(71) Applicant: Beijing Zitiao Network Technology Co., Ltd., Beijing (CN)

(72) Inventor: Hualin Wang, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 256 days.

(21) Appl. No.: 18/666,257

(22) Filed: May 16, 2024

(65) Prior Publication Data

US 2024/0386577 A1 Nov. 21, 2024

(30) Foreign Application Priority Data

May 16, 2023 (CN) ........................ 202310553177.3

(51) Int. Cl.
*G06T 7/20* (2017.01)
*G06T 5/50* (2006.01)
*G06T 7/521* (2017.01)
*G06T 7/70* (2017.01)
*G06V 10/44* (2022.01)
*H04N 23/68* (2023.01)

(52) U.S. Cl.
CPC .................. *G06T 7/20* (2013.01); *G06T 5/50* (2013.01); *G06T 7/521* (2017.01); *G06T 7/70* (2017.01); *G06V 10/44* (2022.01); *H04N 23/683* (2023.01); *G06T 2207/20221* (2013.01)

(58) Field of Classification Search
None
See application file for complete search history.

(56) References Cited

U.S. PATENT DOCUMENTS

2015/0229911 A1* 8/2015 Ge .......................... G06T 7/521 348/47
2024/0119568 A1* 4/2024 Tovchigrechko ......... G06T 7/10
2024/0121370 A1* 4/2024 Xiong .................. H04N 13/111

FOREIGN PATENT DOCUMENTS

CN 112365585 A 2/2021
KR 20210028538 A * 3/2021 ............. G06V 10/40

* cited by examiner

*Primary Examiner* — David Ometz

(57) ABSTRACT

Embodiments of the application provide a method and an apparatus for data processing based on event camera. The method includes: obtaining an event stream generated by an event camera of an XR device; performing an optical flow estimation based on the event stream, and determining motion offset information of a first image based on a result of the optical flow estimation, the first image being an image captured by the first camera; performing motion blur compensation on the first image based on the motion offset information to acquire a first compensated image; and obtaining a depth image corresponding to the first image, and determining a binocular video see-through image based on the first compensated image and the depth image. In the method, the motion offset information of a first image acquired by performing an optical flow estimation based on the event stream generated by an event camera is more accurate.

20 Claims, 6 Drawing Sheets

(1) PHYSICAL OBJECTS TO BE MEASURED (B) AN IMAGE CAPTURED BY THE CAMERA (C)DEPTHS AT DIFFERENT POSITIONS BY CALCULATION

METHOD AND APPARATUS FOR DATA PROCESSING BASED ON EVENT CAMERA

CROSS-REFERENCE

The present application claims priority to Chinese Patent Application No. 202310553177.3, filed on May 16, 2023 and entitled "METHOD AND APPARATUS FOR DATA PROCESSING BASED ON EVENT CAMERA", the entirety of which is incorporated herein by reference.

FIELD

Embodiments of the present application relate to the field of computer vision, and in particular, to a method for data processing based on event camera.

BACKGROUND

Extended Reality (XR) refers to a combination of the reality and the virtual through a computer to create a man-machine interactable virtual environment. XR is also a general name of a plurality of technologies, such as Virtual Reality (VR), Augmented Reality (AR), and Mixed Reality (MR) and the like. By merging these three visual interaction technologies, it brings a 'sense of immersion' that seamlessly transitions between the virtual world and the real world to the experiencers.

With the development of XR devices, more and more XR devices are integrated with various types of cameras, such as a depth camera, an eye tracking camera, a facial expression tracking camera and the like, to enhance the information acquisition and interaction capabilities of XR devices. The camera of the XR device is usually a standard camera, which generates image frames at a fixed time interval. When the camera is moving at a high speed, a captured objective is highly mobile, or in a scene with drastically changing illumination, a problem of motion blur tends to occur.

The problem of motion blur for the XR device may lead to an inaccurate subsequent processing of an image based on the motion blur, which brings a series of problems.

SUMMARY

Embodiments of the present application provide a method and an apparatus for data processing based on event camera, which perform an optical flow estimation based on an event stream generated by the event camera to perform motion blur compensation on a first image. The motion offset information of the first image acquired by performing the optical flow estimation based on the event stream generated by the event camera is more accurate, thus increasing the compensation accuracy of the motion blur in a VST video stream caused by motions of the XR device, and improving the user experience.

In a first aspect, embodiments of the present application provide a method for data processing based on event camera, applied to an extended reality (XR) device, wherein the XR device comprises an event camera and a first camera, and the method comprises:

obtaining an event stream generated by the event camera;

performing an optical flow estimation based on the event stream, and determining motion offset information of a first image based on a result of the optical flow estimation, the first image being an image captured by the first camera;

performing motion blur compensation on the first image based on the motion offset information to acquire a first compensated image; and obtaining a depth image corresponding to the first image, and determining a binocular video see-through (VST) image based on the first compensated image and the depth image.

In some embodiments, the XR device comprises a visual positioning camera;

the obtaining a depth image corresponding to the first image comprises:

obtaining a tracking image captured by the visual positioning camera and inertial measurement unit (IMU) data measured by an IMU of the XR device; and determining the depth image corresponding to the first image based on the tracking image and the IMU data.

In some embodiments, the XR device comprises a structured-light apparatus, and the structured-light apparatus comprises a projector and the event camera;

the obtaining a depth image corresponding to the first image comprises:

obtaining the depth image corresponding to the first image by utilizing the structured-light apparatus.

In some embodiments, the XR device comprises a visual positioning camera and a structured-light apparatus, and the structured-light apparatus comprises a projector and the event camera;

the obtaining a depth image corresponding to the first image comprises:

obtaining a tracking image captured by the visual positioning camera and IMU data measured by an IMU of the XR device;

determining a first depth image corresponding to the first image based on the tracking image and the IMU data;

obtaining a second depth image corresponding to the first image by utilizing the structured-light apparatus; and fusing the first depth image and the second depth image to acquire the depth image corresponding to the first image.

In some embodiments, the obtaining a depth image or a second depth image corresponding to the first image by utilizing the structured-light apparatus comprises:

obtaining the event stream generated by the event camera, a pixel point corresponding to an event in the event stream being a feature point;

performing image preprocessing on the event stream to acquire a feature point of a projection pattern of the structured-light apparatus, the projection pattern being formed by projecting a reference pattern emitted by the projector onto a surface of an object;

performing feature point matching between a feature point of the projection pattern and a feature point of the reference pattern; and calculating a parallax of a matching feature point based on a result of the feature point matching, and determining depth information of a matching feature point of the projection pattern based on the parallax of the matching feature point to acquire the depth image or the second depth image corresponding to the first image.

In some embodiments, the determining a depth image or a first depth image corresponding to the first image based on the tracking image and the IMU data comprises:

estimating pose estimation information of the XR device based on the tracking image and the IMU data;

determining a candidate depth image corresponding to the first image based on the tracking image; and determining the depth image or the first depth image corresponding to the first image based on the pose estimation information of the XR device and the candidate depth image corresponding to the first image.

In some embodiments, after the performing motion blur compensation on the first image based on the motion offset information to acquire a first compensated image, the method further comprises:

performing a pose estimation based on the first compensated image and IMU data measured by an IMU of the XR device to acquire pose estimation information of the XR device.

In some embodiments, the performing a pose estimation based on the first compensated image and IMU data measured by an IMU of the XR device to acquire pose estimation information of the XR device comprises:

performing a feature point extraction on the first compensated image;

performing triangulation processing on a feature point of the first compensated image to acquire three-dimensional coordinates of the feature point of the first compensated image;

selecting a landmark point based on the three-dimensional coordinates of the feature point of the first compensated image; and processing the IMU data and the selected landmark point through a graph optimization algorithm to acquire the pose estimation information corresponding to the XR device.

In some embodiments, the performing an optical flow estimation based on the event stream, and determining motion offset information of a first image based on a result of the optical flow estimation comprises:

performing a time-stamp synchronization between the event stream and the first image;

performing the optical flow estimation based on a synchronization event of the first image and a synchronization event of a reference image of the first image, the reference image being n images preceding the first image, n being an integer greater than or equal to 1; and determining the motion offset information of the first image based on the result of the optical flow estimation.

In some embodiments, the performing an optical flow estimation based on a synchronization event of the first image and a synchronization event of a reference image comprises:

performing the optical flow estimation based on pose estimation information of the XR device, the synchronization event of the first image, and the synchronization event of the reference image, wherein the pose estimation information of the XR device is estimated based on an image preceding the first image.

In some embodiments, the IMU data is synchronized with a time stamp of the tracking image.

In some embodiments, the IMU data is synchronized with a time stamp of the first compensated image.

In another aspect, embodiments of the present application provide an apparatus for data processing based on event camera, applied to an XR device, wherein the XR device comprises an event camera and a first camera, and the apparatus comprises:

a first obtaining module for obtaining an event stream generated by the event camera;

an optical flow estimation module for performing an optical flow estimation based on the event stream, and determining motion offset information of a first image based on a result of the optical flow estimation, the first image being an image captured by the first camera;

a compensation module for performing motion blur compensation on the first image based on the motion offset information to acquire a first compensated image;

a second obtaining module for obtaining a depth image corresponding to the first image; and a determination module for determining a binocular VST image based on the first compensated image and the depth image.

In a further aspect, embodiments of the present application provide an XR device. The XR device comprises: a processor and a memory, the memory configured for storing a computer program, the processor configured for invoking and running the computer program stored in the memory to perform the method as described above.

In still another aspect, embodiments of the present application provide a computer-readable storage medium having a computer program stored thereon, wherein the computer program causes a computer to perform the method as described above.

In yet another aspect, embodiments of the present application provide a computer program product comprising a computer program, wherein the computer program, when executed by a processor, carries out the method as described above.

Embodiments of the present application provide a method and an apparatus for data processing based on event camera, which obtain an event stream generated by the event camera of the XR device; perform an optical flow estimation based on the event stream; determine motion offset information of a first image based on a result of the optical flow estimation, the first image being an image captured by a first camera of the XR device; perform motion blur compensation on the first image based on the motion offset information to acquire a first compensated image; obtain a depth image corresponding to a first image, and determine a binocular video see-through (VST) image based on the first compensated image and the depth image. In the method, the motion offset information of the first image acquired by performing the optical flow estimation based on the event stream generated by the event camera is more accurate, thus increasing the compensation accuracy of the motion blur in a VST video stream caused by motions of the XR device, and improving the user experience.

BRIEF DESCRIPTION OF THE DRAWINGS

In order to illustrate the technical solutions in the embodiments of the present invention more clearly, the drawings for describing the embodiments will be briefly introduced below. It is apparent that the drawings in the following description relate to merely some of the embodiments of the present invention, and those of ordinary skill in the art would acquire other drawings from these drawings without creative efforts.

DETAILED DESCRIPTION

Figures 1, 2:
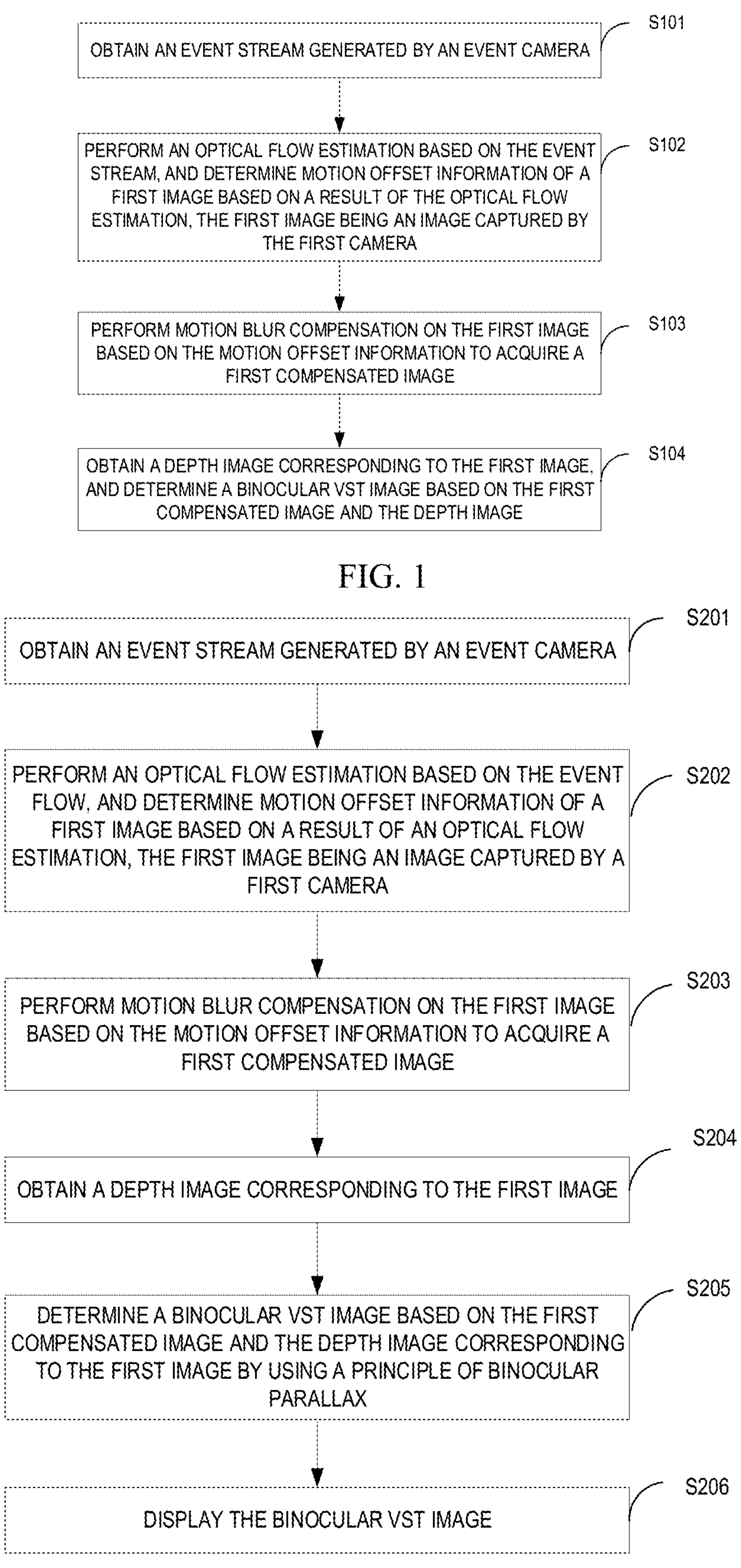
FIG. 1 is a flowchart of a method for data processing based on event camera according to a first embodiment of the present application.
FIG. 2 is a flowchart of a method for data processing based on event camera according to a second embodiment of the present application.

The technical solutions in the embodiments of the present invention will be clearly and completely described below with reference to the accompanying drawings in the embodiments of the present invention. It is apparent that the described embodiments are merely a part rather than all of the embodiments of the present invention. All other embodiments acquired by those of ordinary skill in the art based on the embodiments of the present invention without creative efforts shall fall within the scope of protection of the present invention.

It should be noted that, the terms such as 'first', 'second' and the like in the specification and claims of the present invention and the accompanying drawings mentioned above are used to distinguish similar objects, and are not necessarily used to describe a particular sequence or order. It should be understood that the data used in such a way may be interchanged, where appropriate, so that the embodiments of the present invention described herein can be implemented in an order other than those illustrated or described herein. Furthermore, the terms 'include' and 'have' and any variations thereof, are intended to cover a non-exclusive inclusion, for example, a process, method, system, product, or server that contains a series of steps or units is not necessarily limited to those expressly listed, but may include other steps or units not expressly listed or inherent to such process, method, product or device.

Embodiments of the present application provide a method for data processing based on event camera, which is applied to an XR device. XR refers to a combination of the reality and the virtual through a computer to create a man-machine interactable virtual environment. XR is also a general name of a plurality of technologies, such as Virtual Reality (VR), Augmented Reality (AR), and Mixed Reality (MR) and the like. By merging these three visual interaction technologies, it brings a 'sense of immersion' that seamlessly transitions between the virtual world and the real world to the experiencers.

VR: the technology for creating and experiencing the virtual world, which computes and generates a virtual environment which is multi-source information (virtual reality as referred to herein comprises at least visual perception, in addition to auditory perception, haptic perception, motion perception, and even gustatory perception, olfactory perception, and the like), implements a simulation of a fused, interactive, three-dimensional dynamic view of a virtual environment and entity behaviors, immerses a user in the simulated virtual reality environment, and enables the applications in a variety of virtual environments, such as maps, games, videos, education, medical care, simulation, collaborative training, marketing, aided manufacturing, maintenance, and repair and the like.

The VR device refers to a terminal for implementing a virtual reality effect, which may usually be provided in a form of glasses, a head mount display (HMD), or contact lenses for realizing visual perception and other forms of perception, but of course the form of realizing the virtual reality device is not limited thereto, and can be further miniaturized or large-scaled as needed.

Optionally, the virtual reality device described in the embodiments of the present application may include, but is not limited to, the following types:

2.1) A personal computer virtual reality (PCVR) device which utilizes a PC end to perform calculations related to virtual reality functions and data output; and an external computer-end virtual reality device which utilizes data output from the PC end to realize the virtual reality effect.

2.2) A mobile virtual reality device which supports the setting of a mobile terminal (e.g., smartphone) in various manners (e.g., a head-mounted display provided with a special card slot), by connecting with the mobile terminal in a wired or wireless manner, the mobile terminal performs calculations related to a virtual reality function, and outputs data to the mobile virtual reality device, for example, watching a virtual reality video through an APP of the mobile terminal.

2.3) An all-in-one virtual reality device that has a processor for performing calculations related to a virtual function, and thus having independent virtual reality input and output functions without the need to be connected to a PC end or a mobile terminal, and having a high degree of freedom in use.

AR: AR scenery refers to a simulated scenery in which at least one virtual object is superimposed on a physical scenery or a representation thereof. For example, an electronic system may have an opaque display and at least one imaging sensor for capturing images or videos of a physical scenery that are representations of the physical scenery. The system combines the images or the videos with the virtual object and displays the combination on the opaque display. The individual uses the system to indirectly view the physical scenery via the images or videos of the physical scenery and to observe the virtual object superimposed on the physical scenery. In a case where the system captures images of the physical scenery using one or more image sensors, and uses those images to present the AR scenery on the opaque display, the displayed images are referred to as video passthrough. Alternatively, the electronic system for displaying the AR scenery may have a transparent or semi-transparent display through which the individual may directly view the physical scenery. The system may display the virtual object on the transparent or semitransparent display such that the individual views the virtual object superimposed on the physical scenery by using the system. As another example, the system may include a projection system that projects the virtual object onto the physical scenery. The virtual object may be projected, for example, on a physical surface or as a hologram, such that the individual views the virtual object superimposed on the physical scenery by using the system. Specifically, a technique that during a process of image acquisition by a camera, a camera posture parameter of the camera in the real world (or referred to as a three-dimensional world, or the realistic world) is calculated in real time, and a virtual element is added to the image captured by the camera based on the camera posture parameter. Virtual elements include, but are not limited to, images, videos, and three-dimensional models. The goal of AR technology is to snap the virtual world onto the real world on a screen and interact with it.

MR: Virtual scene information is presented in a real scene, and an information loop for interactive feedback is established between a real world, a virtual world, and a user, so as to enhance the sense of reality of the user experience. For example, a computer-created sensory input (e. g., a virtual object) is integrated in a simulated scenery with a sensory input from a physical scenery or a representation thereof. In some MR scenery, the computer-created sensory input may adapt to changes in the sensory input from the physical scenery. Additionally, some electronic systems for presenting the MR scenery may monitor the orientation and/or position relative to the physical scenery to enable the virtual object to interact with real objects (i.e., physical elements or representations thereof from the physical scenery). For example, the system may monitor motion such that the virtual plant appears stationary relative to the physical building.

The method provided in the embodiments of the present application is applied to an XR device using an event camera. The event camera is a neuromimetic visual sensor inspired by the retina of human eyes. It captures a change of an external world based on an event-driven manner. A working principle of it is greatly different from that of a traditional camera (or referred to as a standard camera). Compared with a traditional camera that collects an image at a fixed frame rate, an image frame update manner does not exist in an event camera. In response to the scene of the external world changes, the event camera performs a series of pixel-level updates, and does not update a part that does not change.

In a pixel array, in response to the variation of the intensity of a pixel exceeding a threshold, the corresponding pixel produces an output independently, the output being referred to as an 'event'. Hence, unlike a standard camera, data output by the event camera is an event stream in the space-time. Each event in the event stream includes at least two parts of information, which may be expressed as (x, y, t), wherein (x, y) indicates a position of an event pixel, and the position of the pixel may be expressed by a two-dimensional coordinate, and t indicates a time stamp of the event pixel.

Optionally, the event information may further comprise a polarity of a pixel, the polarity reflects a trend of brightness change of the pixel, and there are two trends comprising a rising trend and falling trend, or the event information comprises a brightness change value.

Several concepts are highlighted here: (1) luminance change: the output of the event camera is related to the change of the luminance value, and has no relation to the absolute value of the luminance; (2) Thresholds: In response to the brightness change reaches a certain degree, data is output, and this threshold is an inherent parameter of a camera.

Event cameras have the following advantages over traditional cameras:

(1) Unaffected by Motion Blur

A traditional camera captures a video image at a fixed frame rate, and there are certain exposure events between frames. If the moving speed of the camera is too fast or the moving speed of the objective is too fast, the motion blur occurs, leaving a section of ghost. In contrast, an event camera has a very high update speed rate, and the update speed of adjacent events may be less than 1 microsecond, so that a highly moving scene can be obtained.

(2) Higher Dynamic Range

The dynamic range of a traditional camera is relatively low, and when encountering darker or too bright light scenes, the image is usually blurred; while the event camera can overcome the situation of too dark or too bright light, the dynamic range thereof can be twice as much as that of a normal camera; and with regard to a picture with relatively strong brightness and darkness, it is not easy to cause the failure of a sensor such as over-exposure, under-exposure and the like.

(3) Lower Power

The event camera has no exposure time and the concept of a "frame", and each pixel independently outputs an asynchronous data stream, thereby reducing the delay of data from a sensor end to a processor end. In addition, an output signal of the event camera filters out a stationary object, greatly reducing data redundancy, and mitigating a large amount of computation power of data transmission and processing at the source. Hence, the power of event cameras is much lesser than the power of traditional cameras.

An event camera is composed of a lens and an event camera receiving chip, wherein the lens is used for collecting external brightness, and the receiving chip is used for outputting an event based on brightness information collected by the lens, thereby forming an image.

The problem of motion blur exists in the XR device, which may lead to an inaccuracy of the subsequent processing of an image based on the motion blur, thereby causing a series of problems.

A common motion blur scenario is motion blur of a video see-through (VST) image. The VST acquires a real-time view of a surrounding environment by utilizing a camera of a head-mounted XR device (which may also be referred to as a head-mounted device for short), processing an image captured by a camera by means of an anti-distortion algorithm, and then outputting it on a display of an XR device to simulate external a see-through image, that is, the user can see the external environment through the display of the XR device.

The VST enables a user to interact with the real world without removing a head-mounted device, for example, switching on a controller, signing in a file, operating a mobile phone, etc., and therefore, the VST is widely applied to XR devices. A user performs movement wearing a head-mounted device, and image content seen on a display screen of the head-mounted device changes along with the movement of the user. If the movement speed of the user is too fast, an image seen by the user will be blurred.

Another common motion blur scenario is six degrees of freedom (D of) positioning tracking. In addition to detecting a change in a view angle caused by rotation of a head (degrees of freedom of three rotation angles), a head-mounted XR device of 6D of may also detect a change caused by up-down, back-front, left-right displacements (degrees of freedom related to three displacements) caused by body movement.

In 6D of positioning tracking, an image is captured by utilizing a camera on a head-mounted XR device, and positioning tracking is performed by visual synchronous localization and mapping (SLAM). A SLAM module in the XR device obtains feature point information in an environment, and constructs a map based on the feature point to implement positioning of the XR device.

SLAM relates to a series of complex calculations and algorithms. A sensor is used to construct a map and a structure in an unknown environment, and the position and direction of a device are located. Relevant steps may comprise: the sensor reads data such as laser scanning, a video image or a point cloud and the like; a front-end visual odometry (V0) estimates a change in a pose of a camera at two moments by algorithms such as feature matching and direct registration and the like; The rear end receives a camera pose measured by a visual odometry at a different moment, and obtains a globally consistent track and map after optimizing the camera pose. In the process, loop detection, error accumulation processing, map establishment, and the like are involved.

The use of standard cameras in the visual odometer section presents accuracy and robustness problems while dealing with extreme environments. Extreme cases mainly include two cases: a high-speed movement of a camera; when a standard camera is used to obtain an image, if the camera moves too fast, a motion blur phenomenon may occur in the obtained image; In the case of a scene with a high dynamic range, the light intensity in the scene changes strongly, and the brightness and darkness of the previous and next frames change obviously. In these extreme cases, the accuracy and effectiveness of the estimation of the visual odometry state can be severely affected if standard cameras are used.

After some concepts involved in the embodiments of the present application are introduced, the following specifically describes a method for data processing based on event camera according to the embodiments of the present application with reference to the accompanying drawings. For the same content, reference is made to the description in the foregoing embodiments, and the description is not repeated herein.

FIG. 1 is a flowchart of a method for data processing based on event camera according to a first embodiment of the present application. The method of this embodiment is performed by an XR device, and the XR device comprises an event camera and a first camera, wherein the first camera is a standard camera.

As shown in FIG. 1, the method in this embodiment includes the following steps.

S101, obtaining an event stream generated by the event camera.

The event stream includes a plurality of events, and a content of each of the events includes pixel coordinates and a timestamp at which the event occurs.

S102, performing an optical flow estimation based on the event stream, and determining motion offset information of a first image based on a result of the optical flow estimation, the first image being an image captured by the first camera.

Exemplarily, a time-stamp synchronization between the event stream and the first image is performed, the optical flow estimation is performed based on a synchronization event of the first image and a synchronization event of a reference image of the first image, the reference image is n images preceding the first image, n is an integer greater than or equal to 1, and the motion offset information of the first image is determined based on the result of the optical flow estimation.

The first camera is a standard camera, and the acquisition frequency of the event camera is much higher than that of the standard camera. For example, the standard camera generally acquires 15 frames or 30 frames of images within 1 second, while the event camera may acquire thousands of frames of images. Data collected by the two cameras is not synchronous. Therefore, time-stamp synchronization needs to be first performed between an event stream collected by the event camera and a first image collected by the first camera.

Time-stamp synchronization may be understood as time matching or frame matching, that is, matching an event from an event stream to an event that has the same time stamp as that of each collected first image of a first camera. For ease of description, in the embodiments of the present application, an event that is synchronized with a time stamp of each frame image collected by a standard camera is referred to as a synchronization event of an image.

Time-stamp synchronization is performed between data collected by two cameras, then followed by optical flow estimation. The optical flow is "an instantaneous velocity" of a pixel motion of an object moving in space on the observed imaging plane. In computer vision, the motion of an object in an image is defined, where the motion may be caused by camera movement or object movement. The optical flow estimation may be understood as a motion vector of the pixels representing the same object (item) in a frame of a video image to a next frame. The motion vector includes a motion distance and a motion direction. The motion vector may be understood as a pose change of two frames of the image. The pose change includes changes in position and pose.

In this embodiment, the optical flow estimation is performed based on the synchronization event of two frames of images (a first image and a reference image of the first image) to obtain a result of the optical flow estimation. The result of the optical flow estimation is a motion vector of two frames of image, that is, a motion vector of the first image relative to the reference image. The reference image of the first image is the first n images preceding the first image, where n is an integer greater than or equal to 1. The reference image is temporally prior to the first image. If n is 1, the reference image is an adjacent image of the first image, and if n is not 1, the reference image is separated from the first image by 1 or more images.

The result of the optical flow estimation is a motion vector of a first image relative to a reference image; a predicted image of the first image is obtained through prediction based on the motion vector and the reference image; motion offset information of the first image is determined based on the predicted image and the first image; and the motion offset information may be understood as a residual of the first image and the predicted image.

The optical flow estimation may use any existing estimation method, for example, a Lucas-Kanade algorithm, a deep learning algorithm (FlowNet/FlowNet 2.0), and the embodiments of the present application do not limit this.

Optionally, in one implementation, the optical flow estimation may be performed in combination with the pose estimation information of the XR device. The optical flow estimation is performed based on the pose estimation information of the XR device, the synchronization event of the first image, and the synchronization event of the reference image, thereby improving accuracy of the result of the optical flow estimation. The pose estimation information of the XR device is acquired by performing estimation based on a previous frame image of the first image, and the pose estimation information may be implemented based on a 6D of positioning tracking function.

S103, performing motion blur compensation on the first image based on the motion offset information to acquire a first compensated image.

Based on the motion offset information obtained by the optical flow estimation, motion blur compensation is performed on the first image to acquire a clear first compensated image. In this embodiment, the motion offset information is acquired by performing optical flow estimation based on an event stream generated by an event camera. The event camera is applicable to a scenario of high-speed motion or a scenario of strong brightness and darkness, so that the motion offset information acquired through estimation is more accurate, and a result of a motion blur compensation on a first image is also more accurate.

S104, acquiring a depth image corresponding to the first image, and determining a binocular VST image based on the first compensated image and the depth image.

After motion blur compensation is performed on the first image, subsequent processing is performed by using the first compensated image, so that a processing result based on the first compensated image is more accurate. A motion blur scenario includes but is not limited to a VST scenario and a 6 D of positioning tracking scenario. In the VST scenario, a first image is used for video see-through. Motion blur compensation is performed on the first image, so that a binocular VST image determined based on the first compensated image is a clear image. Motion blur of a VST video stream caused by motion of a head-mounted XR device is compensated, thereby improving user experience. In a 6D of positioning tracking scenario, a first image is used for positioning tracking, and motion blur compensation is performed on the first image used for positioning tracking, thereby improving the accuracy and robustness of a positioning tracking result.

In this embodiment, obtaining an event stream generated by an event camera of an XR device, performing optical flow estimation abased on the event stream, and determining motion offset information of a first image based on a result of the optical flow estimation, the first image being an image captured by a first camera of the XR device; performing motion blur compensation on the first image based on the motion offset information to acquire a first compensated image; acquiring a depth image corresponding to a first image, and determining a binocular VST image based on the first compensated image and the depth image. In the method, motion offset information of the first image acquired by performing the optical flow estimation based on the event stream generated by the event camera is more accurate, so that the first compensated image acquired by performing motion blur compensation on the first image is clearer, thereby increasing the compensation accuracy of motion blur in a VST video stream caused by motions of a head-mounted XR device, and improving the user experience.

On the basis of Embodiment 1, Embodiment 2 of the present application provides a method for data processing based on event camera, which is used to compensate for motion blur in a VST scenario, and a first image captured by a first camera is used for a VST; therefore, the first camera may also be referred to as a VST camera. FIG. 2 is a flowchart of a method for data processing based on event camera according to a second embodiment of the present application. As shown in FIG. 2, the method provided in this embodiment includes the following steps.

S201, obtaining an event stream generated by an event camera.

S202, performing the optical flow estimation based on the event stream, and determining motion offset information of a first image based on a result of the optical flow estimation, the first image being an image captured by the first camera.

Exemplarily, time-stamp synchronization is first performed between an event stream and a first image to obtain a synchronization event of the first image, and after a VST function is enabled, time-stamp synchronization is performed between each first image captured by the first camera and the event stream. Then, optical flow estimation is performed based on the synchronization event of the first image and the synchronization event of the reference image of the first image to obtain the result of the optical flow estimation, where the reference image is the first n frame images of the first image, and n is an integer greater than or equal to 1. Finally, motion offset information of the first image is determined based on the result of the optical flow estimation.

S203, performing motion blur compensation on the first image based on the motion offset information to acquire a first compensated image.

The first image is a color image captured by a first camera, the first image being a 2D image, and motion blur compensation is performed on the first image based on motion offset information acquired by performing an optical flow estimation on an event stream, and motion blur of a VST video stream caused by motion of a head-mounted XR device is compensated.

For a specific implementation of steps S201-S203, refer to the related description in Embodiment 1, which is not described herein again.

S204, obtaining a depth image corresponding to the first image.

In this embodiment, an XR device further includes a depth camera. The depth camera is used to obtain the depth image corresponding to the first image, where the depth image corresponding to the first image includes depth information of each pixel in the first image, and the depth information is also referred to as a depth value. With the data obtained by the depth camera, a distance between each pixel point in an image and the camera (i.e., the depth value of the pixel point) may be determined, and by adding (x, y) coordinates of the pixel point in the 2D image, three-dimensional spatial coordinates of each pixel point in the image may be obtained. A real scene can be restored from the three-dimensional coordinates, which in turn realizes applications such as scene modelling.

In this embodiment, the depth camera includes, but is not limited to, one or more of the following cameras: a structured-light apparatus, a binocular camera, a monocular camera, and a Time of Flight (TOF) sensor.

The structured-light apparatus is an important branch in the computer stereoscopic vision technology, and its main principle is to project a specific pattern through an emitter, then recognize this pattern in an image captured by a camera, and deduce a three-dimensional shape of an object by calculating the degree of deformation and the position of the pattern.

The binocular camera is based on the parallax principle, and it uses the method of using two cameras to acquire two images of an object to be measured from different positions, and calculates a position deviation between feature points corresponding to the images to obtain three-dimensional geometric information of the object.

A monocular camera takes several images at different angles (temporal sequences) through one camera, and then solves the images through a series of methods such as Mobileye monocular ranging, so as to obtain depth information of the images.

The Tof sensor determines the distance by measuring the time of flight of the light, specifically, the distance is determined by continuously emitting laser pulses to a target to be measured, receiving the reflected light by the sensor, and detecting the round-trip time of the flight of the light pulses.

S205, determining a binocular VST image based on the first compensated image and the depth image corresponding to the first image by using a principle of binocular parallax.

The binocular VST image comprises a VST image of a left eye and a VST image of a right eye, and the binocular VST image estimation is performed using a principle of binocular parallax. It may be understood as a back-calculation of depth measured by a binocular camera. Upon calculating a depth calculation using a binocular camera, a depth value of a pixel point may be calculated using a parallax of two images (equivalent to left and right eye images) and a parameter of a camera. Conversely, when the depth value of one pixel point and the parameters of the camera are known, the parallax of the two images may also be calculated, thus, a binocular VST image is obtained.

S206, displaying a binocular VST image.

After the binocular VST image is acquired from the estimation, the binocular VST image is displayed on the screen. Exemplarily, the XR device has dual screens, and the binocular VST image is separately displayed on each screen.

In this embodiment, the event stream generated by the event camera is obtained, the optical flow estimation is performed based on the event stream, motion offset information of the first image is determined based on a result of the optical flow estimation, and motion blur compensation is performed on the first image based on the motion offset information to acquire the first compensated image, the depth image corresponding to the first image is obtained, a binocular VST image is determined based on the first compensated image and the depth image corresponding to the first image by using a principle of binocular parallax, and the binocular VST image is displayed. In the method, the motion offset information of the first image acquired by performing the optical flow estimation based on the event stream generated by the event camera is more accurate, and thus the first compensated image acquired by performing motion blur compensation on the first image is clearer. In this way, the compensation accuracy of the motion blur in a VST video stream caused by motions of the XR device is increased, and the user experience is improved.

Embodiment 3 of the present application provides a depth image acquisition method of a structured-light apparatus based on an event camera. The structured-light apparatus comprises an event camera and an emitter. The method in this embodiment may be used to obtain a depth image of a first image in Embodiment 1 and Embodiment 2. The method may also be applied to another scenario in which a depth image needs to be calculated in an XR device. The embodiments of the present application are not limited thereto.

Figure 3:
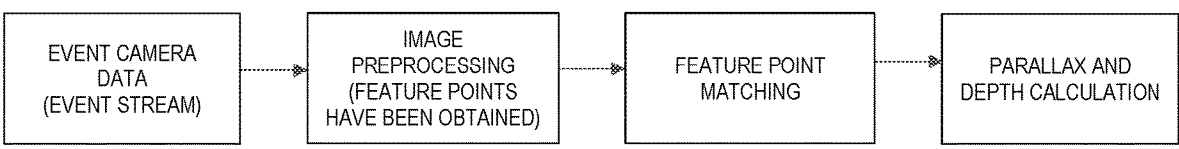
FIG. 3 is a schematic diagram of a method for obtaining a depth image based on the structured-light of the event camera.
Figure 4:
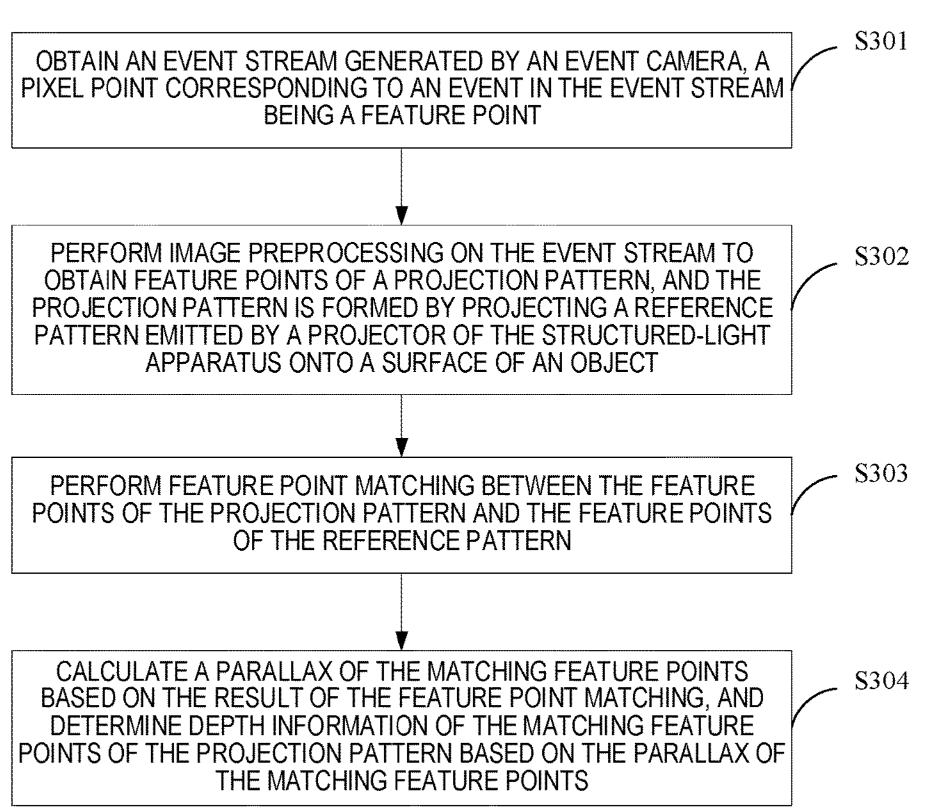
FIG. 4 is a flowchart of a method for obtaining a depth image based on the structured-light of the event camera according to a third embodiment of the present application.

FIG. 3 is a principal diagram of a depth image acquisition method of a structured-light apparatus based on an event camera. FIG. 4 is a flowchart of a depth image acquisition method of a structured-light apparatus based on an event camera according to Embodiment 3 of the present application. Referring to FIG. 3 and FIG. 4, the method provided in this embodiment includes the following steps.

S301, obtaining an event stream generated by an event camera, a pixel point corresponding to an event in the event stream being a feature point.

A feature point refers to a point at which a gray-scale value of an image changes dramatically or a point at which a curvature is large on an edge of the image (namely, an intersection point of two edges). A feature point of an image plays a very important role in an image matching algorithm based on the feature point. The feature point of the image can reflect essential features of the image, and can identify a target object in the image, and the matching of the image may be completed by means of matching of the feature point.

The structured-light apparatus comprises an event camera and an emitter. The emitter is used for projecting a fixed pattern onto the surface of an object. The fixed pattern projected by the emitter is referred to as a reference pattern hereinafter. The emitter is also referred to as a projector, and is provided with a fixed frequency and power.

After an emitter projects a reference pattern onto a surface of an object in a real scene, a lens of an event camera collects an illumination change in the real scene. A receiving chip of an event camera receives a change in light intensity in a real scene, and outputs an event at a pixel coordinate position of a reference pattern, directly capturing a projection pattern captured by a structured-light apparatus and a corresponding pixel coordinate, wherein the projection pattern is a pattern corresponding to a recognized reference pattern in an image captured by an event camera.

The reference pattern projected by the emitter includes, but is not limited to, patterns such as random speckle, pseudo random speckle, stripe structured-light, and two-dimensional code structured-light and the like.

Optionally, a wavelength of a filter of a receiving chip of the event camera is 850 nm±15 nm or 940 nm±15 nm, and correspondingly, a wavelength range of the emitter is slightly smaller than a spectral bandwidth of the receiving chip of the event camera. A main reason for using a narrow-bandwidth filter is to reduce interference of ambient light on an event camera and improve an imaging signal-to-noise ratio.

Hardware parameters, such as an exposure duration, a duty ratio, a current and a voltage and the like, of a laser of an emitter can be configured, and a threshold voltage of a receiving chip of an event camera can also be dynamically adjusted. By adjusting these parameters, objects with different distances and different reflectivity can be imaged.

S302, performing image preprocessing on the event stream to obtain feature points of a projection pattern, and the projection pattern is formed by projecting a reference pattern emitted by a projector of the structured-light apparatus onto a surface of an object.

The time stamping alignment is performed on the events in the event stream, i.e. combining the pixel points corresponding to events with the same time stamp to form the projection pattern.

Image pre-processing includes, but is not limited to, one or more of processing: adjusting exposure parameters, removing image noise, normalization processing, binarization processing, or filtering processing.

S303, performing the feature point matching between the feature points of the projection pattern and the feature points of the reference pattern.

Because the collection frequency of the event camera is relatively high, a large number of projection patterns will be formed, and feature point matching can be performed between feature points of projection patterns of each time stamp and feature points of reference patterns. Alternatively, a feature point of the projection pattern with apart of time stamp may be selected to perform feature point matching with a feature point of the reference pattern. For example, feature point matching is performed every 10, 20, or 30 time stamps.

A suitable time stamp may be selected according to a usage scenario of a depth image to perform feature point matching. For example, in a VST scenario in Embodiment 2, time stamp synchronization may be performed between an event stream and a first image, and feature point matching is only performed between a feature point of a projection pattern synchronized with the time stamp of the first image and a feature point of a reference pattern.

S304, calculating a parallax of the matching feature point based on the result of the feature point matching, and determining depth information of the matching feature points of the projection pattern based on the parallax of the matching feature points.

In a VST scenario, depth information of each matching feature point of a projection pattern forms a depth image corresponding to a first image.

Figure 5:
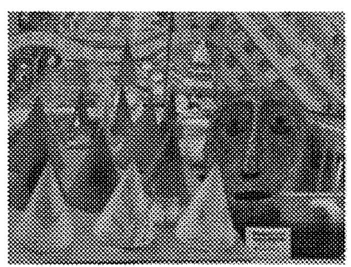
FIG. 5 is a schematic diagram of image comparison at various stages of obtaining the depth image by utilizing the structured-light.
Figure 5:
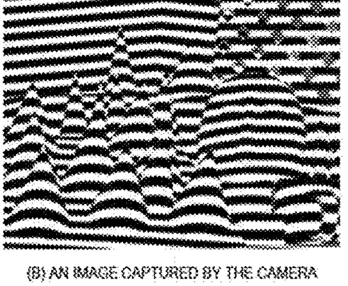
Figure 5:
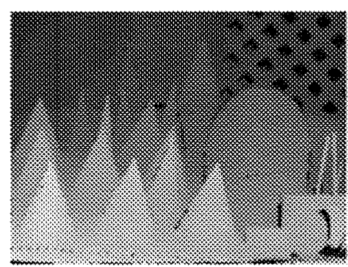

FIG. 5 is a schematic diagram of the image comparison in each stage of obtaining a depth image by utilizing a structured-light apparatus.

Steps S302 to S304 sequentially correspond to the image preprocessing, feature point matching, parallax, and depth calculation in FIG. 3.

A common structured-light apparatus uses a standard camera, and a receiving chip of the structured-light apparatus generally uses a Global Shutter global exposure shutter image sensor to capture a projection pattern, and then sequentially performs the following processing on the projection pattern: image pre-processing, feature point extraction, feature point matching, parallax and depth calculation. Pixel accuracy and a baseline distance of feature point extraction determine accuracy of depth calculation, and a density of a depth image is determined by a resolution of an image sensor and the number of feature points. With the improvement of image sensor resolution, hardware power consumption and an algorithm computation complexity increase exponentially.

Different from a standard camera, a pixel point corresponding to an event output by an event camera is a feature point, that is, the event camera completes feature point extraction in a hardware manner. Therefore, by utilizing a structured-light apparatus based on an event camera, a feature point is the output of the event camera, and after image pre-processing, feature point extraction does not need to be performed on data output by the event camera, and feature point matching is directly performed, thereby greatly simplifying the complexity and power consumption of depth image acquisition.

Figure 6:
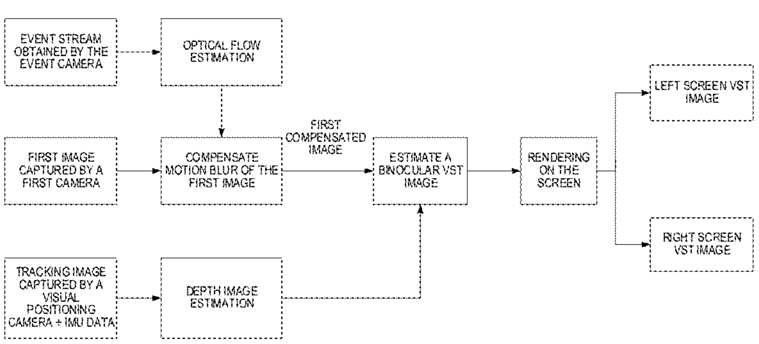
FIG. 6 is a schematic diagram of VST image processing based on the event camera.
Figure 7:
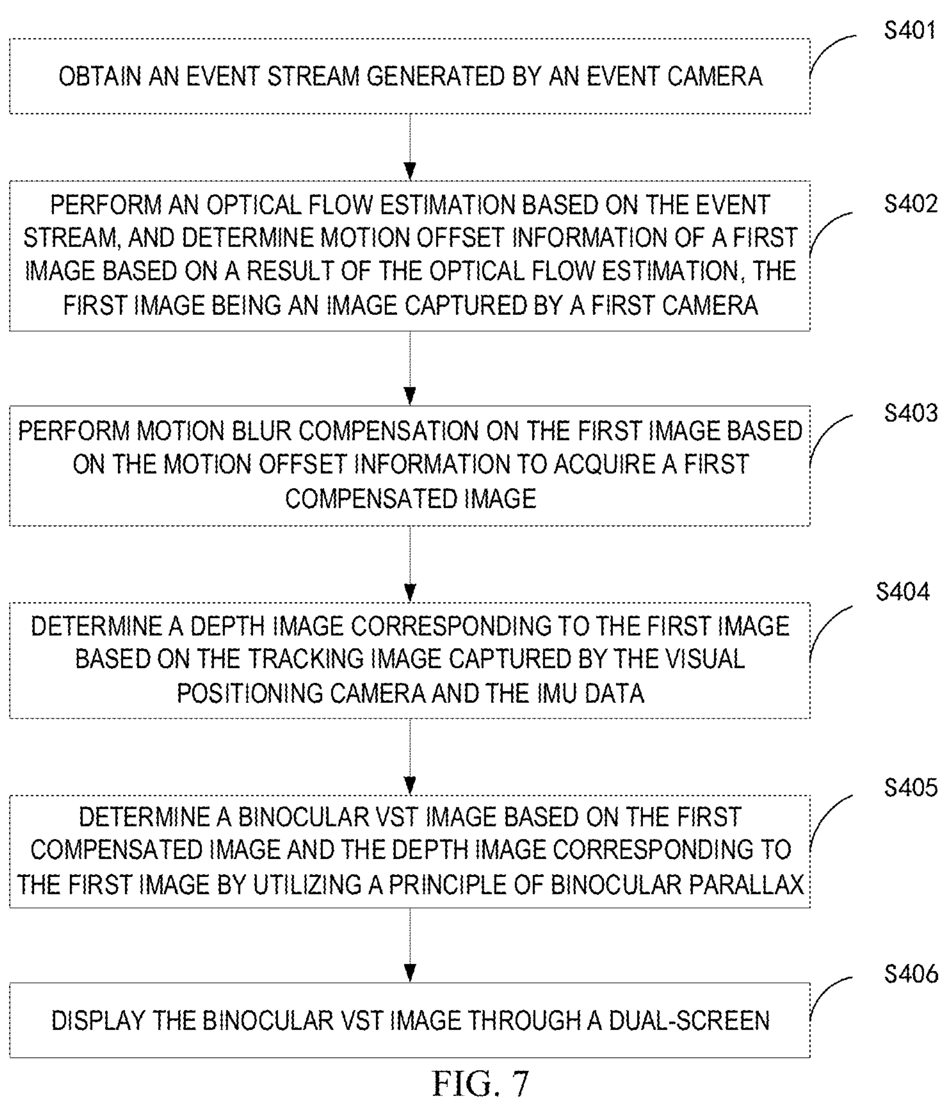
FIG. 7 is a flowchart of the VST image processing based on the event camera according to a fourth embodiment of the present application.

On the basis of Embodiment 2, Embodiment 4 of the present application provides a method for data processing based on an event camera. A depth estimation is performed by utilizing a visual positioning camera (also referred to as a 6D of camera or a tracking camera) and IMU data of an XR device, where the visual positioning camera may be understood as a camera used to perform 6D of positioning tracking, and an image captured by the visual positioning camera is also referred to as a tracking image or a positioning image. FIG. 6 is a schematic diagram of VST image processing based on an event camera. FIG. 7 is a flowchart of VST image processing based on an event camera according to a fourth embodiment of the present application. Referring to FIGS. 6 and 7, the method provided in this embodiment includes the following steps.

S401, obtaining an event stream generated by an event camera.

S402, performing an optical flow estimation based on the event stream, and determine motion offset information of a first image based on a result of the optical flow estimation, the first image being an image captured by a first camera.

S403, performing motion blur compensation on the first image based on the motion offset information to acquire a first compensated image.

S404, determining a depth image corresponding to the first image based on the tracking image captured by the visual positioning camera and the IMU data.

Referring to FIG. 6, step S402 corresponds to the optical flow estimation in FIG. 6, step S403 corresponds to the motion blur compensation of the first image in FIG. 6, and step S404 corresponds to the depth image estimation in FIG. 6.

The visual positioning camera may use one or more groups of binocular cameras. When the vision positioning camera uses a plurality of sets of binocular cameras to perform the depth estimation, the ranges of the angles of view of the plurality of sets of binocular cameras jointly cover the ranges of the angles of view of the first camera. For example, four lenses are used to form a binocular camera, and two adjacent lenses may form a set of binocular cameras. Unlike the first image used for the VST, the image collected by the visual positioning camera is typically a black and white image.

When a plurality of sets of binocular components are used to perform depth estimation, each set of binocular cameras obtain one candidate depth image of a first image by estimation, and candidate depth images of a plurality of first images obtained by the plurality of sets of binocular cameras through estimation are fused to obtain a depth image of the first image.

Exemplarily, pose estimation information of the XR device is obtained by estimation based on the tracking image and IMU data, where the pose estimation information of the XR device is 6D of data. Estimate a candidate depth image corresponding to a first image based on the tracking image, and determine a depth image corresponding to the first image based on the pose estimation information of an XR device and the candidate depth image corresponding to the first image. Fuse based on the pose estimation information of an XR device and a candidate depth image corresponding to the first image to acquire a depth image corresponding to a first image, so that the depth image corresponding to the first image is more accurate.

S405, determining a binocular VST image by utilizing a principle of binocular parallax based on the first compensated image and the depth image corresponding to the first image.

S406, displaying the binocular VST image through a dual-screen.

Referring to FIG. 6, step S405 corresponds to the estimating binocular VST image in FIG. 6, and step S406 corresponds to rendering on the screen in FIG. 6.

In this embodiment, the depth image corresponding to the first image is determined based on the tracking image captured by the visual positioning camera and IMU data, and thus the depth image corresponding to the first image is more accurate. As such, the estimation result of the binocular VST image is more accurate, and the VST image viewed by a user is closer to a real scene, thereby improving user experience.

In an embodiment of the present application, depth estimation may also be performed in combination with a visual positioning camera and a structured-light apparatus based on an event camera, so as to improve accuracy of an estimation result of a depth image corresponding to a first image. Specifically, obtaining a tracking image captured by a visual positioning camera and IMU data measured by an IMU of an XR device, and determining a first depth image corresponding to the first image based on the tracking image and the IMU data; a structured-light apparatus based on an event camera is used to obtain a second depth image corresponding to a first image, and the first depth image and the second depth image are fused to obtain a depth image corresponding to the first image. Wherein, for an estimation method of the first depth image, reference is made to the description in Embodiment 4, and for an estimation method of the second depth image, reference is made to the description in Embodiment 3, which are not repeated herein.

Figure 8:
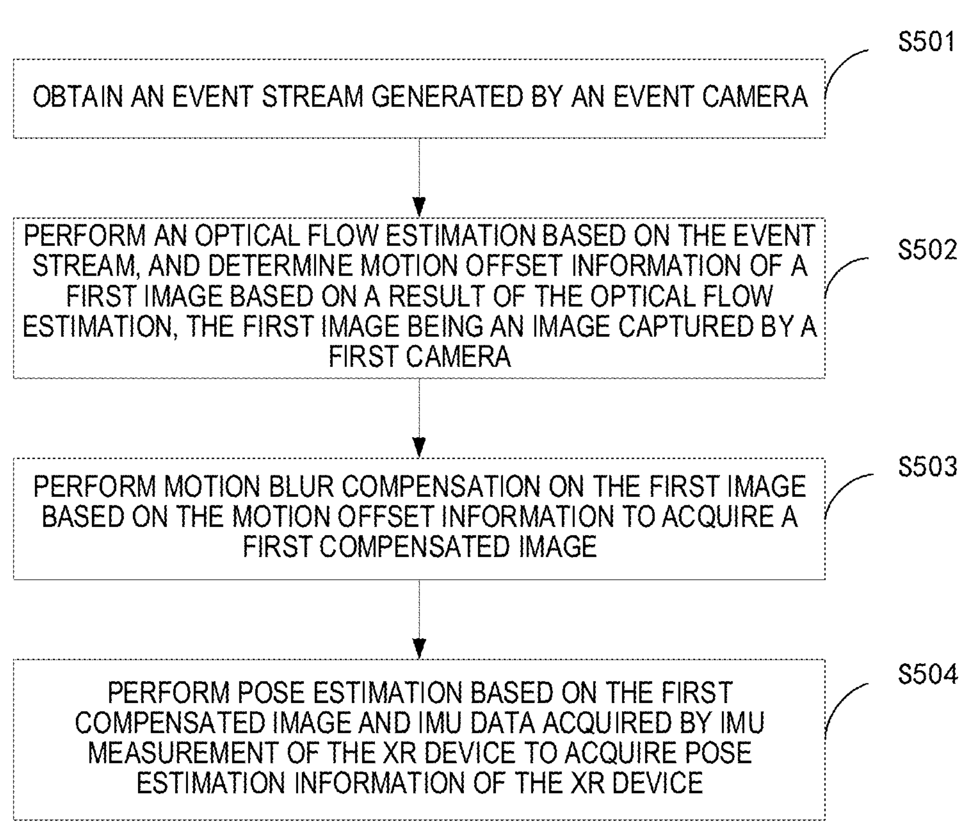
FIG. 8 is a flowchart of a method for data processing based on the event camera according to a fifth embodiment of the present application.

The fifth embodiment of the present application provides a method for data processing based on an event camera, which is used for compensating motion blur in a 6D of positioning tracking scenario, that is, a first image captured by a first camera in the first embodiment is used for performing 6D of positioning tracking, and therefore, the first camera is a visual positioning camera, and the first image is a tracking image. FIG. 8 is a flowchart of a method for data processing based on an event camera according to a fifth embodiment of the present application. As shown in FIG. 8, the method provided in this embodiment includes the following steps.

S501, obtaining an event stream generated by an event camera.

S502, performing an optical flow estimation based on the event stream, and determining motion offset information of a first image based on a result of the optical flow estimation, the first image being an image captured by a first camera.

In this embodiment, the first camera is a visual positioning camera, and the first image is used to perform 6D of positioning tracking.

S503, performing motion blur compensation on the first image based on the motion offset information to acquire a first compensated image.

For a specific implementation of steps S201-S203, refer to the related description in Embodiment 1, which is not described herein again.

S504, performing pose estimation based on the first compensated image and IMU data acquired by IMU measurement of the XR device to acquire pose estimation information of the XR device.

The IMU data synchronizes with a time-stamp of the first image, and before step S504, the XR device performs time-stamp synchronization between the IMU data and the first image. The XR device may also synchronize the first image, IMU data, and the event stream when performing the optical flow estimation.

The first camera may be a binocular depth camera. The first camera performs depth estimation based on a first image captured by the binocular depth camera, so as to acquire a depth image of the first image, and then performs pose estimation based on the IMU data and the depth image of the first image, so as to acquire pose estimation information of the XR device.

Exemplarily, a feature point extraction is performed on the first compensated image, and a triangulation processing is performed on the feature point of the first compensated image to acquire a three-dimensional coordinates of the feature point of the first compensated image, and a landmark point is selected based on the three-dimensional coordinates of the feature point of the first compensated image, and IMU data and the landmark point of the first compensated image are processed by using a graph optimization algorithm to acquire pose estimation information corresponding to the XR.

In this embodiment, the event stream generated by the event camera is obtained; the optical flow estimation is performed based on the event stream; motion offset information of the first image is determined based on a result of the optical flow estimation; motion blur compensation is performed on the first image based on the motion offset information to acquire a first compensated image; and a pose estimation is performed based on the first compensated image and IMU data to acquire pose estimation information of the XR device. In the method, optical flow estimation is performed based on the event stream generated by the event camera to perform motion blur compensation on a first image used for tracking positioning, thereby increasing the accuracy and robustness of tracking positioning of a head-mounted XR device in scenarios such as over-exposure scenarios and fast motion scenarios, and improving the user experience.

It should be noted that the method according to the fifth embodiment of the present application may be used alone, or may be combined with the method according to any one of the first embodiment to the fourth embodiment, that is, the motion blur compensation may be used to acquire the first compensated image for performing the 6DOF tracing positioning, or the first compensated image may be used to perform the blur compensation for the VST video stream. The 6 DOF tracking positioning and the blur compensation of the VST video stream may also be performed simultaneously using the first compensated image.

Figure 9:
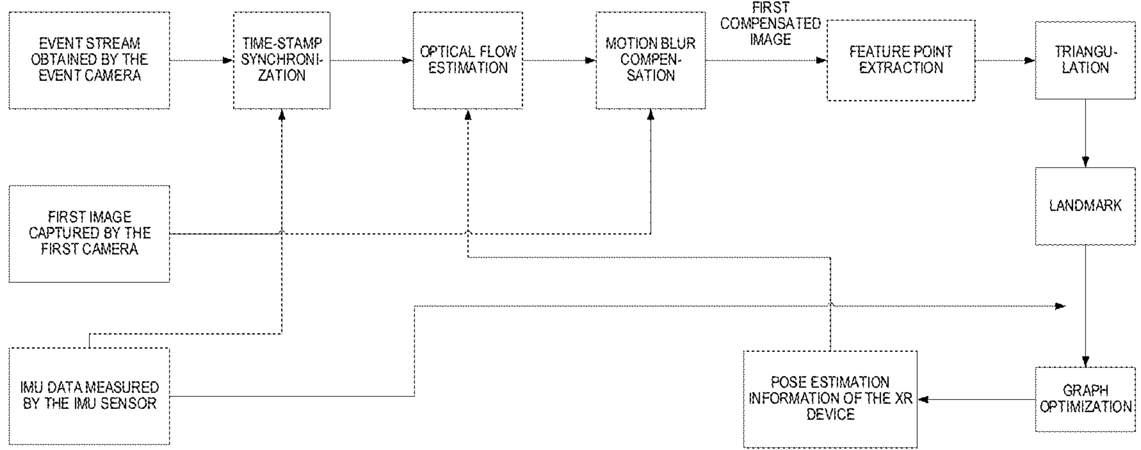
FIG. 9 is a schematic diagram of 6D of location tracking based on the event camera.
Figure 10:
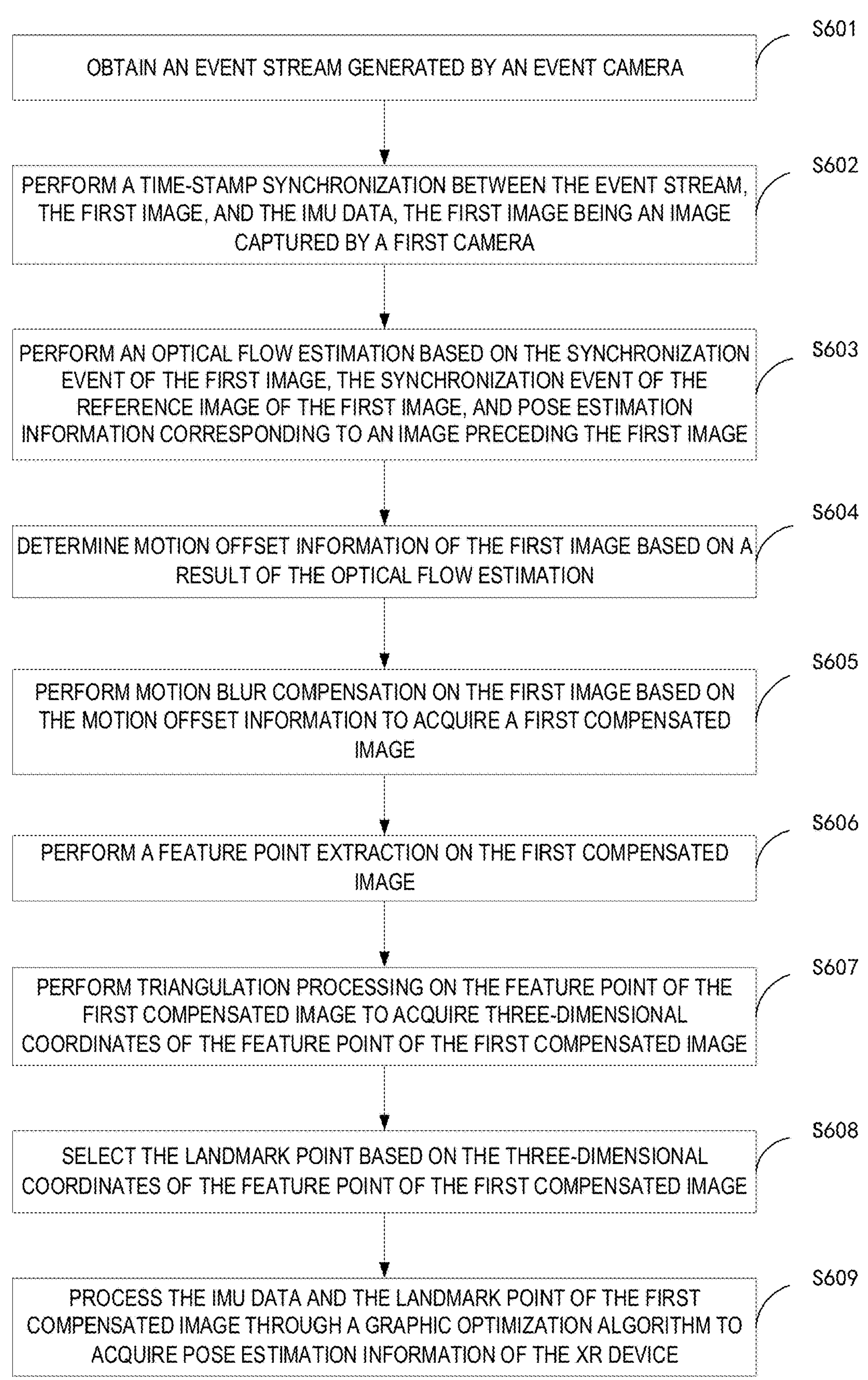
FIG. 10 is a flowchart of 6D of location tracking based on the event camera according to a sixth embodiment of the present application.

On the basis of Embodiment 5, Embodiment 6 of the present application provides a method for data processing based on an event camera, which is used for describing a 6DOF positioning tracking process. FIG. 9 is a schematic diagram of the 6DOF positioning tracking based on the event camera. FIG. 10 is a flowchart of the 6DOF positioning tracking based on the event camera provided by Embodiment 6 of the present application. Referring to FIGS. 9 and 10, the method provided by this embodiment includes the following steps.

S601, obtaining an event stream generated by an event camera.

S602, performing a time-stamp synchronization between the event stream, the first image, and the IMU data, the first image being an image captured by the first camera.

This step corresponds to the time-stamp synchronization in FIG. 9.

S603, performing an optical flow estimation based on the synchronization event of the first image, the synchronization event of the reference image of the first image, and pose estimation information corresponding to an image preceding the first image.

The present embodiment further fuses pose estimation information of the XR device when the optical flow estimation is performed based on the event stream. The pose estimation information of the XR device is pose estimation information corresponding to the image preceding the first image, so that the pose estimation information of the XR device is more accurate.

Optionally, in other embodiments of the present application, when performing the optical flow estimation, instead of fusing the pose estimation information corresponding to the image preceding the first image, the optical flow estimation may be performed based on the synchronization event of the first image and the synchronization event of the reference image of the first image.

S604, determining motion offset information of the first image based on a result of the optical flow estimation.

S605, performing motion blur compensation on the first image based on the motion offset information to acquire a first compensated image.

Steps S603 to S605 correspond to the motion blur compensation in FIG. 9.

S606, performing a feature point extraction on the first compensated image.

This step corresponds to the feature point extraction in FIG. 9. Exemplarily, an algorithm such as a FAST corner detection algorithm, a Harris corner detection algorithm, Scale-invariant feature transform (SIFT), Speed Up Robust Features (SURF) and the like may be used to perform the feature point extraction, which is not limited in the embodiments of the present application.

S607, performing triangulation processing on the feature point of the first compensated image to acquire three-dimensional coordinates of the feature point of the first compensated image.

This step corresponds to the triangulation in FIG. 9, and the triangulation method may be understood as: observing the same three-dimensional point P (x, y, z) at different positions; given that two-dimensional projection points X1(x1, y1), X2(x2, y2) of the three-dimensional point observed at different positions, recovering depth information z of the three-dimensional point by utilizing a trigonometric relationship. In this embodiment, the depth values of the feature points of the first compensated image are calculated by utilizing the triangulation method.

S608, selecting a landmark point based on the three-dimensional coordinates of the feature point of the first compensated image.

This step corresponds to the landmark in FIG. 9. Due to a large number of feature points of the first compensated image, too many feature points lead to a large amount of computation required for subsequent processing, and there are some feature points that are not necessary, and whose existence has no effect on the final estimation result. Therefore, in this embodiment, some key feature points or typical feature points are selected as landmark points.

S609, processing the IMU data and the landmark point of the first compensated image through a graphic optimization algorithm to acquire pose estimation information of the XR device.

The landmark point of the first compensated image represents coordinates of the landmark point relative to the XR device at a certain time instant. Based on the landmark point of the first compensated image, the IMU data, and the parameters of the camera, information of six degrees of freedom of the XR device in a real scene, i.e. pose estimation information of the XR device, may be acquired through reverse estimation.

The actual pose of the XR device in the real scene deviates from the estimated pose; therefore, an optimization function is established to optimize the error between the actual pose of the XR device in the real scene and the estimated pose. After the optimization function is established, the error is continuously optimized through an iterative method to obtain the estimated pose corresponding to the minimum error as final pose estimation information of the XR device. The graph optimization algorithm includes, but is not limited to, a least squares method, a maximum likelihood estimation method, and the like.

This step corresponds to the graph optimization in FIG. 9, and the pose estimation information of the XR device in the current frame is acquired through the graph optimization estimation. It can be seen from FIG. 7 that the pose estimation information of the XR device in the current frame is used for performing motion blur compensation on the next tracking image, thereby improving the accuracy and robustness of tracking positioning.

It should be noted that the motion blur compensation in the 6D of tracing positioning scenario and the motion blur compensation in the VST scenario may use the same compensation method or use different compensation methods. The method for motion blur compensation in the scenario of 6D of tracing positioning shown in FIG. 9 may be the method for motion blur compensation in the scenario of VST shown in FIG. 6. Likewise, the method for motion blur compensation in the scenario of VST shown in FIG. 6 may also be the method for motion blur compensation in the scenario of 6D of tracing positioning shown in FIG. 9.

Figure 11:
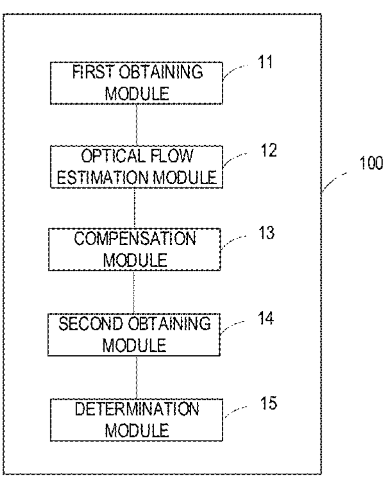
FIG. 11 is a schematic structural diagram of an apparatus for data processing based on the event camera according to a seventh embodiment of the present application.

To better implement the method for data processing based on an event camera in the embodiments of the present application, the embodiments of the present application further provide an apparatus for data processing based on an event camera. The apparatus is applied to an XR device, and the XR device includes an event camera and a first camera. FIG. 11 is a schematic structured diagram of an apparatus for data processing based on an event camera according to a seventh embodiment of the present application. As shown in FIG. 11, the event camera-based data processing apparatus 100 may include:

- a first obtaining module 11, configured to obtain an event stream generated by the event camera;
- an optical flow estimation module 12, configured to perform an optical flow estimation based on the event stream, and determine motion offset information of a first image based on a result of the optical flow estimation, the first image being an image captured by the first camera;
- a compensation module 13, configured to perform motion blur compensation on the first image based on the motion offset information to obtain a first compensated image;
- a second obtaining module 14, configured to obtain a depth image corresponding to the first image;
- a determination module 15, configured to determine a binocular video see-through (VST) image based on the first compensated image and the depth image.

In some embodiments, the XR device includes a visual positioning camera;

The second obtaining module 14 is specifically configured to:

- obtain tracking images captured by the visual positioning camera and IMU data measured by an inertial measurement unit (IMU) of the XR device;
- determine a depth image corresponding to the first image based on the tracking image and the IMU data.

In some embodiments, the XR device comprises a structured-light apparatus, the structured-light apparatus comprising a projector and the event camera; The second obtaining module 14 is specifically configured to obtain a depth image corresponding to the first image by utilizing the structured-light apparatus.

In some embodiments, the XR device includes a visual positioning camera and a structured-light apparatus, the structured-light apparatus including a projector and the event camera; the second obtaining module 14 is specifically configured to:

obtain the tracking image captured by the visual positioning camera and IMU data measured by an inertial measurement unit (IMU) of the XR device;

determine a first depth image corresponding to the first image based on the tracking image and the IMU data;

obtain a second depth image corresponding to the first image by utilizing the structured-light apparatus;

fusing the first depth image and the second depth image to acquire a depth image corresponding to the first image.

In some embodiments, the obtaining a depth image or a second depth image corresponding to the first image by utilizing a structured-light apparatus specifically is:

obtaining an event stream generated by the event camera, a pixel point corresponding to an event in the event stream being a feature point;

performing image preprocessing on the event stream to acquire a feature point of a projection pattern of the structured-light apparatus, the projection pattern being formed by projecting a reference pattern emitted by the projector onto a surface of an object;

performing feature point matching between feature points of the projection pattern and feature points of the reference pattern;

calculating a parallax of a matching feature point based on a result of feature point matching; and determining depth information of the matching feature point of the projection pattern based on the parallax of the matching feature point to acquire a depth image or a second depth image corresponding to the first image.

In some embodiments, the determining a depth image or a first depth image corresponding to the first image based on the tracking image and the IMU data specifically is:

estimating pose estimation information of the XR device based on the tracking image and the IMU data;

determining a candidate depth image corresponding to the first image based on the tracking image;

determining a depth image or a first depth image corresponding to the first image based on the pose estimation information of the XR device and the candidate depth image corresponding to the first image.

In some embodiments, further comprising a pose estimation module configured to:

perform pose estimation based on the first compensated image and IMU data measured by an inertial measurement unit, MU, of the XR device to acquire pose estimation information of the XR device.

In some embodiments, the pose estimation module is specifically configured to:

perform a feature point extraction on the first compensated image;

perform triangulation processing on the feature point of the first compensated image to acquire three-dimensional coordinates of the feature point of the first compensated image;

select a landmark point based onto the three-dimensional coordinates of feature points of the first compensated image;

process the IMU data and the selected landmark point through a graph optimization algorithm to acquire pose estimation information of the XR device.

In some embodiments, the optical flow estimation module 12 is specifically configured to:

perform a time-stamp synchronization between the event stream and the first image;

perform the optical flow estimation based on a synchronization event of the first image and a synchronization event of a reference image of the first image, the reference image being n images preceding the first image, n being an integer greater than or equal to 1;

determine the motion offset information of the first image based on the result of the optical flow estimation.

In some embodiments, the optical flow estimation module 12 is specifically configured to perform optical flow estimation based on pose estimation information of the XR device, a synchronization event of the first image, and a synchronization event of a reference image, wherein the pose estimation information of the XR device is estimated based on an image preceding the first image.

In some embodiments, the IMU data is synchronized with a time stamp of the tracking image.

In some embodiments, the IMU data is synchronized with a time-stamp of the first compensated image.

It should be understood that the apparatus embodiment and the method embodiment may correspond to each other, and for similar description, reference may be made to the method embodiment. To avoid repetition, no further description will be given here.

The device 100 according to the embodiment of the present application has been described above from the perspective of functional modules in conjunction with the drawings. It should be understood that the functional modules may be implemented in the form of hardware, in the form of software instructions, or in the form of a combination of hardware and software modules. Specifically, each step of the method embodiments in the embodiments of the present application may be completed by means of an integrated logic circuit of hardware in a processor and/or an instruction in the form of software. Steps in combination with the methods disclosed in the embodiments of the present application may be directly embodied as being completed by a hardware decoding processor, or may be completed by using a combination of hardware and software modules in a decoding processor. Optionally, the software module may be located in a mature storage medium in the field, such as a random access memory, a flash memory, a read-only memory, a programmable read-only memory, an electrically erasable programmable memory, and a register. The storage medium is located in a memory, and the processor reads information in the memory and completes the steps in the described method embodiments in combination with hardware thereof.

Figure 12:
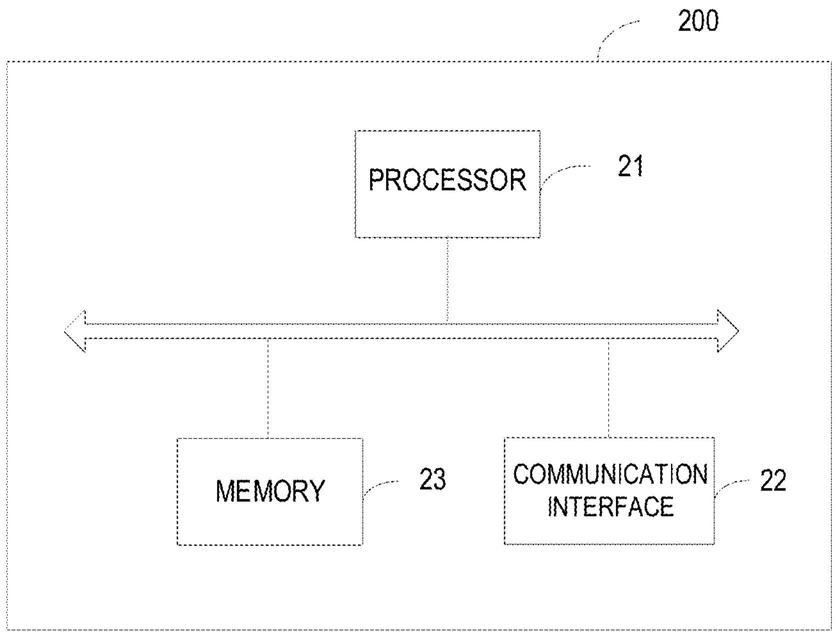
FIG. 12 is a schematic structural diagram of an XR device according to an eighth embodiment of the present application.

The embodiment of the present application further provides an XR device. FIG. 12 is a schematic structural diagram of an XR device provided by Embodiment 8 of the present application. As shown in FIG. 12, the XR device 200 may include:

a memory 21, a processor 22 and a dual camera module 23. The memory 21 is used for storing a computer program and transmitting the program code to the processor 22. In other words, the processor 22 may call and run a computer program from the memory 21 to implement the method in the embodiment of the present application. The dual camera module 23 is configured to collect an image, and send the image to the memory 21 and the processor 22 for processing.

For example, the processor 22 may be configured to execute the foregoing method embodiments according to instructions in the computer program.

In some embodiments of the present application, the processor 22 may include, but is not limited to:

a general purpose processor, a digital signal processor (DSP), an application specific integrated circuit (ASIC), a field programmable gate array (FPGA) or another programmable logic device, a discrete gate or transistor logic device, a discrete hardware component, or the like.

In some embodiments of the present application, the memory 21 includes, but is not limited to:

a volatile memory and/or a non-volatile memory, wherein the non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically Erasable EPROM, EEPROM), or a flash memory. Volatile memory may be random access memory (RAM), which serves as an external cache, by way of example and not limitation, Many forms of RAM are available, such as static random access memory (SRAM), dynamic random access memory (Dynamic RAM), a DRAM, a synchronous dynamic random access memory (Synchronous DRAM, SDRAM), and a double data rate synchronous dynamic random access memory (Double Data Rate SDRAM), DDR SDRAM), Enhanced Synchronous Dynamic Random Access Memory (Enhanced SDRAM, ESDRAM), Synchronous Link DRAM, SLDRAM) and Direct Memory Bus Random Access Memory (DDR RAM).

In some embodiments of the present application, the computer program may be divided into one or more modules, and the one or more modules are stored in the memory 21 and executed by the processor 22 to complete the method provided in the present application. The one or more modules may be a series of computer program instruction segments capable of performing a particular function, the instruction segments describing the execution of the computer program in the XR device.

As shown in FIG. 12, the XR device 200 may also include a transceiver 24, which may be connected to the processor 22 or memory 21.

The processor 22 may control the transceiver 24 to communicate with other devices, specifically, can send information or data to other devices, or receive information or data sent by other devices. Transceiver 23 may include a transmitter and a receiver. Transceiver 24 may further include an antenna, and the number of antennas may be one or more.

It should be understood that although not shown in FIG. 12, the XR device 200 can further include a wireless fidelity WIFI module, a positioning module, a Bluetooth module, a display, a controller, and the like, which are not described herein again.

It should be understood that the components in the XR device are connected via a bus system, wherein the bus system comprises a power bus, a control bus and a state signal bus in addition to a data bus.

The present application also provides a computer storage medium, on which a computer program is stored. The computer program, when executed by a computer, enables the computer to execute the method of the described method embodiment. Alternatively, the embodiments of the present application further provide a computer program product comprising instructions. When the instructions are executed by a computer, the computer executes the method of the described method embodiment.

The present application also provides a computer program product. The computer program product comprises a computer program. The computer program is stored in a computer-readable storage medium. A processor of an XR device reads the computer program from the computer-readable storage medium, and the processor executes the computer program, so that the XR device executes a corresponding procedure in a map relocating method combining semantic information in the embodiments of the present application. For brevity, details are not described herein again.

In the several embodiments provided in the present application, it should be understood that the disclosed system, apparatus, and method may be implemented in other manners. For example, the apparatus embodiments described above are merely exemplary. For example, division of the module is merely logical function division, and may be other division in actual implementation. For example, a plurality of modules or components may be combined or may be integrated into another system, or some features may be ignored or not executed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network elements. A part or all of the modules may be selected according to actual needs to achieve the objectives of the solutions of the embodiments. For example, each functional module in each embodiment of the present application may be integrated into one processing module, each module may exist alone physically, or two or more modules are integrated into one module.

The foregoing descriptions are merely specific implementations of the present application, and are not intended to limit the scope of protection of the present application. Any variation or replacement readily figured out by a person skilled in the art within the technical scope disclosed in the present application shall belong to the scope of protection of the present application. Therefore, the scope of protection of the present application should be subject to the scope of protection of this claim.

What is claimed is:

1. A method for data processing based on an event camera, applied to an extended reality device, wherein the extended reality device comprises the event camera and a first camera, and the method comprises:

obtaining an event stream generated by the event camera;

performing an optical flow estimation based on the event stream, and determining motion offset information of a first image based on a result of the optical flow estimation, the first image being an image captured by the first camera;

performing motion blur compensation on the first image based on the motion offset information to acquire a first compensated image; and obtaining a depth image corresponding to the first image, and determining a binocular video see-through, VST, image based on the first compensated image and the depth image.

2. The method of claim 1, wherein the extended reality device comprises a visual positioning camera;

the obtaining a depth image corresponding to the first image comprises:

obtaining a tracking image captured by the visual positioning camera and inertial measurement unit, IMU, data measured by an IMU of the extended reality device; and determining the depth image corresponding to the first image based on the tracking image and the IMU data.

3. The method of claim 2, wherein the determining a depth image or a first depth image corresponding to the first image based on the tracking image and the IMU data comprises:

estimating pose estimation information of the extended reality device based on the tracking image and the IMU data;

determining a candidate depth image corresponding to the first image based on the tracking image; and determining the depth image or the first depth image corresponding to the first image based on the pose estimation information of the extended reality device and the candidate depth image corresponding to the first image.

4. The method of claim 2, wherein the IMU data is synchronized with a time stamp of the tracking image.

5. The method of claim 1, wherein the extended reality device comprises a structured-light apparatus, and the structured-light apparatus comprises a projector and the event camera;

the obtaining a depth image corresponding to the first image comprises:

obtaining the depth image corresponding to the first image by utilizing the structured-light apparatus.

6. The method of claim 5, wherein the obtaining a depth image or a second depth image corresponding to the first image by utilizing the structured-light apparatus comprises:

obtaining the event stream generated by the event camera, a pixel point corresponding to an event in the event stream being a feature point;

performing image preprocessing on the event stream to acquire a feature point of a projection pattern of the structured-light apparatus, the projection pattern being formed by projecting a reference pattern emitted by the projector onto a surface of an object;

performing feature point matching between a feature point of the projection pattern and a feature point of the reference pattern; and calculating a parallax of a matching feature point based on a result of the feature point matching, and determining depth information of a matching feature point of the projection pattern based on the parallax of the matching feature point to acquire the depth image or the second depth image corresponding to the first image.

7. The method of claim 1, wherein the extended reality device comprises a visual positioning camera and a structured-light apparatus, and the structured-light apparatus comprises a projector and the event camera;

the obtaining a depth image corresponding to the first image comprises:

obtaining a tracking image captured by the visual positioning camera and IMU data measured by an IMU of the extended reality device;

determining a first depth image corresponding to the first image based on the tracking image and the IMU data;

obtaining a second depth image corresponding to the first image by utilizing the structured-light apparatus; and fusing the first depth image and the second depth image to acquire the depth image corresponding to the first image.

8. The method of claim 1, wherein after the performing motion blur compensation on the first image based on the motion offset information to acquire a first compensated image, the method further comprises:

performing a pose estimation based on the first compensated image and IMU data measured by an IMU of the extended reality device to acquire pose estimation information of the extended reality device.

9. The method of claim 8, wherein the performing a pose estimation based on the first compensated image and IMU data measured by an IMU of the extended reality device to acquire pose estimation information of the extended reality device comprises:

performing a feature point extraction on the first compensated image;

performing triangulation processing on a feature point of the first compensated image to acquire three-dimensional coordinates of the feature point of the first compensated image;

selecting a landmark point based on the three-dimensional coordinates of the feature point of the first compensated image; and processing the IMU data and the selected landmark point through a graph optimization algorithm to acquire the pose estimation information corresponding to the extended reality device.

10. The method of claim 7, wherein the IMU data is synchronized with a time stamp of the first compensated image.

11. The method of claim 1, wherein the performing an optical flow estimation based on the event stream, and determining motion offset information of a first image based on a result of the optical flow estimation comprises:

performing a time-stamp synchronization between the event stream and the first image;

performing the optical flow estimation based on a synchronization event of the first image and a synchronization event of a reference image of the first image, the reference image being n images preceding the first image, n being an integer greater than or equal to 1; and determining the motion offset information of the first image based on the result of the optical flow estimation.

12. The method of claim 11, wherein the performing an optical flow estimation based on a synchronization event of the first image and a synchronization event of a reference image comprises:

performing the optical flow estimation based on pose estimation information of the extended reality device, the synchronization event of the first image, and the synchronization event of the reference image, wherein the pose estimation information of the extended reality device is estimated based on an image preceding the first image.

13. An extended reality device comprising:

a processor and a memory, the memory configured for storing a computer program, the processor configured for invoking and running the computer program stored in the memory to perform:

obtaining an event stream generated by an event camera;

performing an optical flow estimation based on the event stream, and determining motion offset information of a first image based on a result of the optical flow estimation, the first image being an image captured by a first camera;

performing motion blur compensation on the first image based on the motion offset information to acquire a first compensated image; and obtaining a depth image corresponding to the first image, and determining a binocular video see-through, VST, image based on the first compensated image and the depth image.

14. The extended reality device of claim 13, wherein the extended reality device comprises a visual positioning camera;

the obtaining a depth image corresponding to the first image comprises:

obtaining a tracking image captured by the visual positioning camera and inertial measurement unit, IMU, data measured by an IMU of the extended reality device; and determining the depth image corresponding to the first image based on the tracking image and the IMU data.

15. The extended reality device of claim 14, wherein the determining a depth image or a first depth image corresponding to the first image based on the tracking image and the IMU data comprises:

estimating pose estimation information of the extended reality device based on the tracking image and the IMU data;

determining a candidate depth image corresponding to the first image based on the tracking image; and determining the depth image or the first depth image corresponding to the first image based on the pose estimation information of the extended reality device and the candidate depth image corresponding to the first image.

16. The extended reality device of claim 13, the extended reality device comprises a structured-light apparatus, and the structured-light apparatus comprises a projector and the event camera;

the obtaining a depth image corresponding to the first image comprises:

obtaining the depth image corresponding to the first image by utilizing the structured-light apparatus.

17. The extended reality device of claim 16, wherein the obtaining a depth image or a second depth image corresponding to the first image by utilizing the structured-light apparatus comprises:

obtaining the event stream generated by the event camera, a pixel point corresponding to an event in the event stream being a feature point;

performing image preprocessing on the event stream to acquire a feature point of a projection pattern of the structured-light apparatus, the projection pattern being formed by projecting a reference pattern emitted by the projector onto a surface of an object;

performing feature point matching between a feature point of the projection pattern and a feature point of the reference pattern; and calculating a parallax of a matching feature point based on a result of the feature point matching, and determining depth information of a matching feature point of the projection pattern based on the parallax of the matching feature point to acquire the depth image or the second depth image corresponding to the first image.

18. The extended reality device of claim 13, wherein the extended reality device comprises a visual positioning camera and a structured-light apparatus, and the structured-light apparatus comprises a projector and the event camera;

the obtaining a depth image corresponding to the first image comprises:

obtaining a tracking image captured by the visual positioning camera and IMU data measured by an IMU of the extended reality device;

determining a first depth image corresponding to the first image based on the tracking image and the IMU data;

obtaining a second depth image corresponding to the first image by utilizing the structured-light apparatus; and fusing the first depth image and the second depth image to acquire the depth image corresponding to the first image.

19. The extended reality device of claim 13, wherein after the performing motion blur compensation on the first image based on the motion offset information to acquire a first compensated image, the processor configured for invoking and running the computer program stored in the memory to perform:

performing a pose estimation based on the first compensated image and IMU data measured by an IMU of the extended reality device to acquire pose estimation information of the extended reality device.

20. A non-transitory computer-readable storage medium having a computer program stored thereon, wherein the computer program causes a computer to perform:

obtaining an event stream generated by an event camera;

performing an optical flow estimation based on the event stream, and determining motion offset information of a first image based on a result of the optical flow estimation, the first image being an image captured by a first camera;

performing motion blur compensation on the first image based on the motion offset information to acquire a first compensated image; and obtaining a depth image corresponding to the first image, and determining a binocular video see-through, VST, image based on the first compensated image and the depth image.

* * * * *